United States Patent [19]
Thomas et al.

[11] Patent Number: 5,916,699
[45] Date of Patent: *Jun. 29, 1999

[54] HYBRID ENERGY STORAGE SYSTEM

[75] Inventors: George Thomas, Lawrenceville, Ga.;
José M. Fernandez, Sunrise, Fla.;
Georgina Moré, Berkeley Lake, Ga.

[73] Assignee: Motorola, Inc., Schaumburg, Ill.

[*] Notice: This patent is subject to a terminal disclaimer.

[21] Appl. No.: 08/874,813

[22] Filed: May 13, 1997

[51] Int. Cl.[6] .................................................. H01M 16/00
[52] U.S. Cl. .................................................. 429/3; 429/7
[58] Field of Search .................................. 429/3, 7, 9, 60, 429/90; 361/434

[56] References Cited

U.S. PATENT DOCUMENTS

| | | | |
|---|---|---|---|
| 5,670,266 | 9/1997 | Thomas et al. | 429/3 |
| 5,738,919 | 4/1998 | Thomas et al. | 429/3 |

*Primary Examiner*—Anthony Skapars
*Attorney, Agent, or Firm*—Felipe J. Farley

[57] ABSTRACT

An energy storage system (10) including a first energy storage device (12), such as a secondary or rechargeable battery, and a second energy storage device (14), such as a capacitor, fuel cell, or flywheel. The second energy storage device provides intermittent energy bursts to satisfy the power requires of, for example, pulsed power communication devices. Such devices typically require power pulses in excess of those which conventional battery cells can easily provide for numerous cycles. The system (10) further includes circuitry (16) for coupling the second energy storage device (14) to a load in response to changes in the battery (12).

22 Claims, 1 Drawing Sheet

HYBRID ENERGY STORAGE SYSTEM

CROSS REFERENCE TO RELATED APPLICATIONS

This application is related to U.S. application Ser. No. 08/739,475, filed Oct. 28, 1996, by Thomas, et al, now U.S. Pat. No. 5,670,266, entitled "HYBRID ENERGY STORAGE", and assigned to Motorola, Inc.

TECHNICAL FIELD

This invention relates in general to energy storage devices, and in particular to hybrid rechargeable energy storage devices which provide high power and high capacity for portable electronic devices.

BACKGROUND OF THE INVENTION

Consumer markets continue to request smaller, portable electronic devices which having more functional features. Examples of such devices include two-way and broadcast radio receivers, compact disc players, cellular telephones, and computer devices to name but a few. As portable electronic devices have become smaller, the demand for smaller energy sources, such as batteries, to power such devices has increased. Obviously very small energy storage devices, such as an electrochemical battery cell, may be fabricated for a given electrical device; however, compactness comes at the cost of energy capacity. Accordingly, for many high power applications the energy source is too bulky, too heavy, or doesn't last long enough.

As the energy storage device, such as a battery, is discharged, it becomes unable to provide current at a required level. Thus, even though the battery may retain a substantial charge, it is useless to the device to which it is attached. This problem is exacerbated when the device to which the battery is attached requires high power (i.e., current pulses) in an operating cycle which otherwise requires a much lower operating current. Such is the case with portable communications devices, such as digital two-way radios and cellular phones when in the transmit mode. These power pulses or spikes require significantly higher current outputs than when the device is receiving or in standby mode.

As the physical size of batteries decreases (to meet size requirements of product designers), the capacity of the battery is reduced. This results in device users needing many batteries if they anticipate being away from a battery charging device for extended periods of time. Alternatively, users may carry portable, high speed, charging devices with them. This however is unacceptable, due to the additional weight associated with the charging device.

Prior art attempts to address the high power spikes entailed providing electrolytic capacitors in the application device. This had the disadvantage of increasing substantially the size of the application device, as electrolytic capacitors are typically very large, cylindrical devices. Other attempts are described in U.S. Pat. No. 5,439,756 to Anani, et al, in which an electrical energy storage device is provided. The device disclosed in the '756 patent includes a battery electrode, a capacitor electrode, and a third electrode as the counter electrode for both the battery and the capacitor electrodes. The device also includes electronics to switch the third electrode between the battery electrode and the capacitor electrode. A solution to this problem is provided in the aforementioned '517 application which describes a power source having a first component, for example, a battery, for delivering a substantially constant output, and a second component, i.e., a capacitor, which delivers power in response to the power pulses and spikes required by the application device. While this type of power source well addresses the needs of pulsed power application devices, it does not address the fact that charging conditions may require a different trigger point at which the second component is activated. These conditions may be environmental, such as low temperature, or a function of the age of the power source. Failure to recognize the effect of charged condition may also have the deleterious effect of shrinking the life of the power source.

Accordingly, what is needed is an energy source which is capable of providing sufficient power for the high power pulses required of certain devices, while extending the usable life of the energy source. Such a device should be relatively small, and capable of being easily sized and shaped for a given application. Moreover, such a device should be able to recognize charging internal conditions, and alter its response as a function of the charged condition.

DETAILED DESCRIPTION OF THE PREFERRED EMBODIMENT

Figure 1:
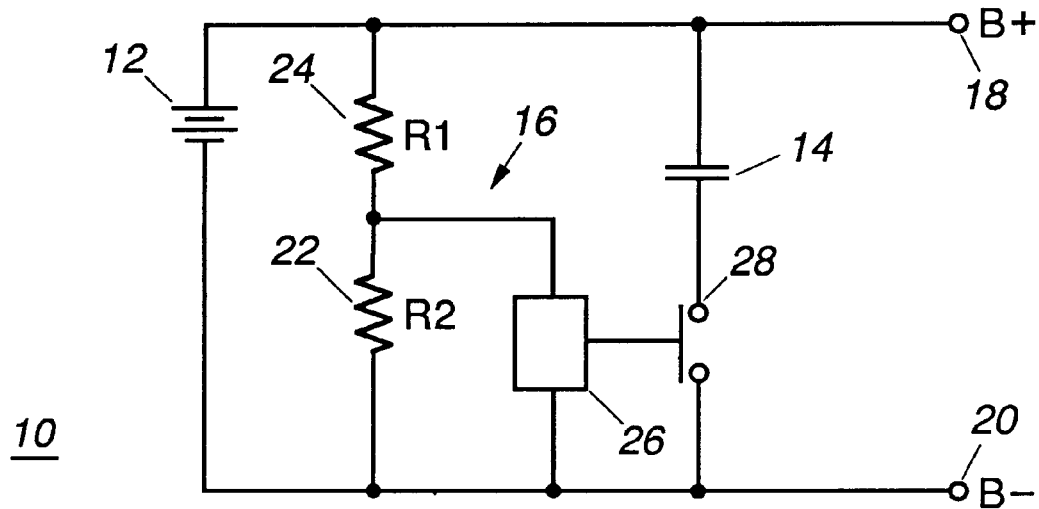
FIG. 1 is a circuit diagram of a hybrid energy storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a circuit diagram of an energy storage device 10 in accordance with the instant invention. The device 10 includes a first energy source 12 having a high energy density, and a high capacity, but which may not be able to provide high power as required by certain applications. The first energy source 12 may thus be one or more conventional battery cells, examples of which include, but are not limited to, a lead-acid battery, a nickel-cadmium battery, a nickel-metal hydride battery, a lithium ion battery, a lithium polymer battery, a lithium ion polymer electrolyte battery, a zinc air battery, and combinations thereof. The battery cell or cells may also be a primary battery, such as a conventional alkaline battery or even a compact portable fuel cell. The battery cell or cells may be disposed in a battery pack.

The diagram 10 also shows that connected electrically in parallel with the first energy source 12 is a second energy source 14. The second energy source is capable of delivering a burst of high power, as may be required by a particular application. As such, the second energy source 14 is preferably an electrochemical capacitor, but can also include other types of capacitors, fuel cells, flywheels or any other power source capable of delivering a burst of high power. For convenience, the second energy source 14 is hereafter referred to as an electrochemical capacitor, although, as mentioned, other devices may alternatively be employed in accordance with the present invention. The electrochemical capacitor devices typically include at least one electrode fabricated of a metal oxide material such as $RuO_2$. The second electrode may also be a similar or different metal oxide, or may be of another type of material altogether. In this regard, the second electrode may be a polymer such as polyanile, polypyrrole, polyurethane, polyacrylomide and combinations thereof. One or both of the electrodes may be fabricated of a carbon based material. The electrolyte may be alkaline, proton conducting, or organic solvent based.

In a preferred embodiment, the capacitor is a thin device including a first electrode, a second electrode, and an electrolyte disposed therebetween. In a preferred embodiment, the capacitor may be fabricated as disclosed in one or more United States patents or patent applications: U.S. Pat. Nos. 5,568,353 to Bai, et al., filed Mar. 31, 1995; 5,574,353 to Bai, et al, filed Mar. 28, 1995; 5,518,838 to Bai, et al., filed Aug. 7, 1995; 5,714,053 to Howard, filed Oct. 15, 1996; U.S. Ser. No. 08/358,294 to Li, et al., filed Dec. 15, 1994; U.S. Pat. Nos. 5,510,046 to Li, et al., Feb. 27, 1995; 5,751,541 to Li, et al., filed Jun. 30, 1995; 5,563,765 to Lian, et al., filed Aug. 26, 1994; and 5,429,895 to Lian, et al., filed Oct. 13, 1994, the disclosures of which are incorporated herein by reference.

Electrically connected between the first and second energy sources is electronic circuitry 16 adapted to determine which energy source to use in response to power demands from an associated electronic device. As noted above, the problems occasioned by high power spikes or peaks are most frequently observed in devices requiring brief, intermittent high power levels. Pulsed power communication devices such as digital cellular phones, two-way radios, and talk-back pagers all make such demands of their associated energy sources. The load which draws current is connected to the energy storage device at contacts 18 and 20.

Regardless of the nature and source of the spikes, circuitry 16 must be adapted to determine which power source is best suited to respond to the power spike. For example, without circuitry, if the second power source delivers power only in response to a spike of greater than a pre-determined value, conditions may arise in which the first power source cannot respond, and the second power source will not respond since the triggering conditions have not been met. For example, as a battery ages, its internal impedance increases, thus rendering it less able to respond to any power spikes. Likewise, at low temperatures, i.e., less than about 0° C., most batteries' impedance increase. In either of these cases, a power spike below the capacitor threshold will not trigger the capacitor while conditions have changed such that the battery cannot respond. The result in both cases is that the load connected at the contacts will fail.

In order to address this, circuitry 16 includes first and second resistors 22 and 24 to provide a measure of the impedance of the battery 12. As impedance changes due to changing internal factors, a controller 26 responds to changes in impedance and activates a switch 28 to electrically couple the capacitor 14 to the load. If the impedance change does not exceed a predetermined threshold, then the battery remains coupled to the load.

Figure 2:
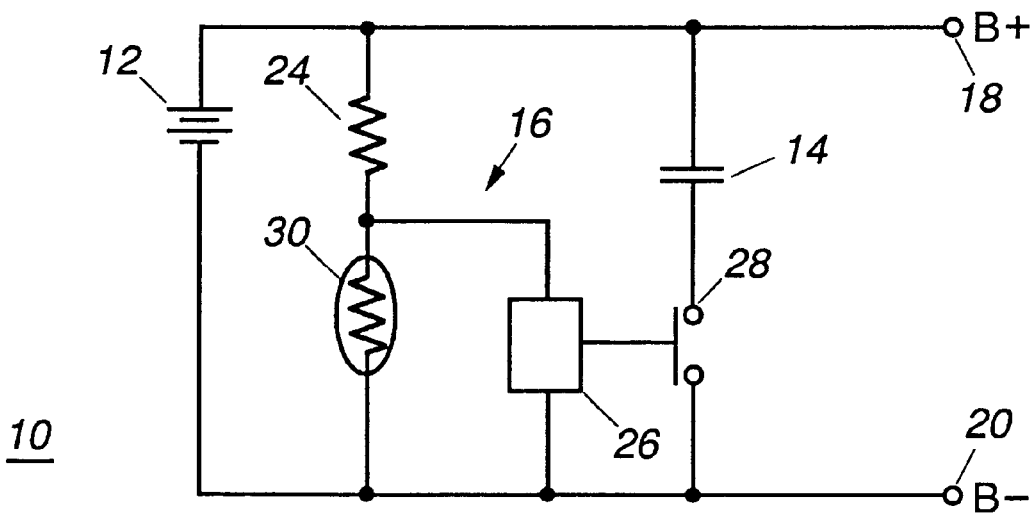
FIG. 2 is a circuit diagram of a second embodiment of a hybrid energy storage device in accordance with the invention.

Attentively, and as is illustrated in FIG. 2, one resistor may be replaced with a thermistor 30. In this embodiment, the circuitry is particularly responsive to changes in impedance resulting from temperature changes. Here, once both impedance and temperature changes exceed predetermined thresholds, the controller enables the switch 28 to couple the capacitor 14 to the load.

In the communications field power spike problems have become acute since the advent of digital communications, in which some communication applications require power pulses on the order of 5 amperes, for relatively long durations, i.e., up to 20 milliseconds, and with a 10 Hz frequency. Other communications systems such as GSM (Global System for Mobile Communication) have relatively narrow pulses and lower currents, but applied with higher frequency, on the order of 200 Hz. For example, the duty cycle for the GSM phone is approximately 4.6 milliseconds (mSec) long. During the duty cycle, there is a peak burst current of approximately 1.42 amps at 6 volts which is required for approximately 0.56 (mSec). During the balance of the duty cycle, the average current drawn is approximately 0.22 amps. This is required for 4.04 mSec. The frequency of the entire duty cycle is in excess of 200 Hz, specifically 217 Hz. Thus, there exists a need for circuitry in an energy storage device including both a battery and a capacitor, which senses changes in the impedance of the battery, due either to age or varying temperature, and which changes the trigger point for the capacitor.

The effect of pulse currents are more acute under certain extreme conditions. For example, certain battery types, such as lithium ion batteries, are adversely affected by excess heat. Accordingly, when the temperature of a lithium ion cell is elevated, its ability to respond to the burst current required of a digital cellular phone, may be compromised. Similarly, nickel metal hydride batteries can deliver significantly less than full power (on the order of less than 40% of stored energy) at low temperatures. Accordingly, at temperatures as low as 0° C. the performance of a nickel metal hydride battery may be so severely compromised that it cannot power a digital cellular phone.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An energy storage system comprising:
    a first energy storage device consisting of a battery having an impedance for providing a substantially constant power output;
    a second energy storage device for providing intermittent bursts of high voltage output; and
    a controller responsive to changes in battery impedance, and controlling a switch for electrically coupling said second energy storage device to a load.

2. An energy storage system as in claim 1, wherein said load is a pulsed power communications device.

3. An energy storage system as in claim 1, further including a pair of resistors coupled to said controller for measuring said battery impedance.

4. An energy storage system as in claim 1, further including at least a resistor and a thermistor electrically coupled to said controller.

5. An energy storage system as in claim 1, wherein said controller enables said switch when battery impedance exceeds a predetermined value.

6. An energy storage system as in claim 1, wherein said battery is a secondary battery.

7. An energy storage system as in claim 6, wherein said secondary battery is selected from the group consisting of lead-acid batteries, nickel cadmium batteries, nickel metal hydride batteries, lithium ion batteries, lithium polymer batteries, and combinations thereof.

8. An energy storage system as in claim 1, wherein said first energy storage device is a primary battery.

9. An energy storage system as in claim 1, wherein said first energy storage device is a fuel cell.

10. An energy storage system as in claim 1, wherein said second energy storage device is a capacitor.

11. An energy storage system as in claim 1, wherein said second energy storage device is a fuel cell.

12. An energy storage system comprising:

a first energy storage device consisting of a battery having an impedance for providing a substantially constant power output;

a second energy storage device for providing intermittent bursts of high voltage output; and circuitry responsive to changes in battery impedance, and controlling a switch for electrically coupling said second energy storage device to a load, said circuitry comprising a pair of resistors electrically coupled to a controller and said controller electrically coupled to said switch.

13. An energy storage system as in claim 12, wherein said load is a pulsed power communications device.

14. An energy storage system as in claim 12, wherein said controller enables said switch when battery impedance exceeds a predetermined value.

15. An energy storage system as in claim 12, wherein said battery is a secondary battery.

16. An energy storage system as in claim 15, wherein said secondary battery is selected from the group consisting of lead-acid batteries, nickel cadmium batteries, nickel metal hydride batteries, lithium ion batteries, lithium polymer batteries, and combinations thereof.

17. An energy storage system as in claim 12, wherein said first energy storage device is a primary battery.

18. An energy storage system comprising:

a first energy storage device consisting of a battery having an impedance for providing a substantially constant power output;

a second energy storage device for providing intermittent bursts of high voltage output; and circuitry responsive to changes in battery impedance due to temperature variations, and controlling a switch for electrically coupling said second energy storage device to a load, said circuitry comprising at least a resistor and a thermistor coupled to a controller, and said controller electrically coupled to said switch.

19. A hybrid energy storage system as in claim 18, wherein said load is a pulsed power communications device.

20. An energy storage system as in claim 18, wherein said controller enables said switch when battery impedance exceeds a predetermined value.

21. An energy storage system as in claim 18, wherein said second energy storage device is a capacitor.

22. An energy storage system as in claim 18, wherein said second energy storage device is a fuel cell.

* * * * *